United States Patent
Tang et al.

(10) Patent No.: US 9,299,367 B1
(45) Date of Patent: Mar. 29, 2016

(54) PERPENDICULAR MAGNETIC RECORDING (PMR) WRITER WITH MINIMIZED INTERNAL FLUX SHUNTING

(71) Applicant: Headway Technologies, Inc., Milpitas, CA (US)

(72) Inventors: YuHui Tang, Milpitas, CA (US); Yaguang Wei, Pleasanton, CA (US); Yue Liu, Fremont, CA (US); Jiun-Ting Lee, Sunnyvale, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/813,887

(22) Filed: Jul. 30, 2015

(51) Int. Cl.
*G11B 5/127* (2006.01)

(52) U.S. Cl.
CPC ................................. *G11B 5/127* (2013.01)

(58) Field of Classification Search
CPC ............ G11B 5/127; G11B 5/33; G11B 5/147
USPC ............... 360/125.3, 125.03, 125.09, 125.04, 360/125.17, 125.12, 125.06, 125.15, 360/125.26, 125.19
See application file for complete search history.

(56) References Cited

U.S. PATENT DOCUMENTS

| | | | |
|---|---|---|---|
| 7,009,812 B2 | 3/2006 | Hsu et al. | |
| 8,051,552 B2 | 11/2011 | Jiang et al. | |
| 8,542,461 B2 | 9/2013 | Bai et al. | |
| 8,830,625 B2 | 9/2014 | Linville et al. | |
| 9,053,715 B1 * | 6/2015 | Wang | G11B 5/3116 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.
Co-pending, U.S. Appl. No. 14/690,693, filed Apr. 20, 2015, "High Moment Side Shield Design for Area Density Improvement of Perpendicular Magnetic Recording (PMR) Writer," by Yue Liu et al., 54 pgs.

* cited by examiner

*Primary Examiner* — Allen T Cao
(74) *Attorney, Agent, or Firm* — Saile Ackerman LLC; Stephen B. Ackerman

(57) ABSTRACT

A perpendicular magnetic recording (PMR) writer is disclosed wherein a 19-24 kG hot seed layer is formed between a gap layer and a 10-19 kG magnetic layer in a partially wrapped around shield structure involving side shields and trailing shield to reduce internal flux shunting, improve writability, and enable side gap and write gap dimensions 5-10 nm smaller than typical writers for conventional and shingled magnetic recording. Side shields have a bottom surface formed along a plane that is parallel to the main pole leading edge, and at a down-track distance from 50 nm above to 100 nm below the leading edge. Cross-track and down-track field gradients are improved by fully coupling the trailing shield and side shield hot seed layers. Also, side shield hot seed layers have a height <0.15 micron and less than the 10-19 kG side shield layer height to reduce internal flux shunting.

31 Claims, 8 Drawing Sheets

PERPENDICULAR MAGNETIC RECORDING (PMR) WRITER WITH MINIMIZED INTERNAL FLUX SHUNTING

RELATED PATENT APPLICATION

This application is related to the following: Ser. No. 14/690,693, filed on Apr. 20, 2015, assigned to a common assignee and herein incorporated by reference in its entirety.

TECHNICAL FIELD

The present disclosure relates to a shield structure in a PMR write head wherein a high moment (>19 to 24 kG) layer partially wraps around the main pole in the cross-track and trailing side directions, and the leading shield is omitted to minimize internal flux shunting between the main pole and shield structure thereby enhancing writability and improving overwrite (OW) and bit error rate (BER) performance.

BACKGROUND

A PMR write head typically has a main pole with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop. The trailing loop generally has a trailing shield structure that arches over the write coils and connects to a top surface of the main pole layer above a back gap magnetic connection. The first trailing shield that adjoins a top surface of the write gap may have a high moment (19-24 kG) layer called a hot seed layer. A good hot seed response is required to reduce stray fields in the side shields and leading shield. The leading loop includes a leading shield with a side at the ABS and that is connected to a return pole proximate to the ABS. The return path (RTP) extends to the back gap connection and enables magnetic flux in the leading loop pathway to return from the leading shield at the ABS and through the back gap connection to the main pole layer. A PMR head which combines the features of a single pole writer and a double layered medium (magnetic disk) has a great advantage over longitudinal magnetic recording (LMR) in providing higher write field, better read back signal, and potentially much higher areal density.

Shingled magnetic recording (SMR) is a form of PMR and has been proposed for future high density magnetic recording by R. Wood et al. in "The Feasibility of Magnetic Recording at 10 Terabits Per Square Inch on Conventional Media", IEEE Trans. Magn., Vol. 45, pp. 917-923 (2009). In this scheme, tracks are written in a sequential manner from an inner diameter (ID) to an outer diameter (OD), from OD to ID, or from OD and ID towards a middle diameter (MD) in a radial region of a disk in a hard disk drive (HDD). In other words, a first track is partially overwritten on one side when a second track adjacent to the first track is written, and subsequently a third track is written that partially overwrites the second track, and so forth. Track widths are defined by the squeeze position or amount of overwrite on the next track rather than by the write pole width as is the case in today's hard drives.

One of the main advantages of shingled writing is that write pole width no longer needs to scale with the written track width. Thus, the opportunity for improved writability and higher device yield is not restricted by using pole width as a critical dimension to be tightly controlled. Secondly, adjacent track erasure (ATE) becomes less of an issue because tracks are written sequentially in a cross-track dimension and only experience a one time squeeze from the next track.

For both conventional (CMR) and shingle magnetic recording (SMR), continuous improvement in storage area density is required for a PMR writer. A write head that can deliver or pack higher bits per inch (BPI) and higher tracks per inch (TPI) is essential to the area density improvement. In a typical fully wrapped around shield design for a PMR write head, the main pole and hot seed in the first trailing shield are usually comprised of high moment (19 to 24 kG) material while the leading shield, side shields, and remainder of the trailing shield structure are made of low moment (10-19 kG) materials. If writability can be sustained, the main pole size must shrink, and a thinner write gap at the main pole trailing (top) surface and a narrower side gap adjoining the main pole sides in the cross-track direction are preferred for better track field gradient ($Hy\_grad$, BPI) and cross-track field gradient ($Hy\_grad\_x$, TPI), respectively. However, with extremely narrow magnetic spacing between the main pole and surrounding shields, internal flux shunting becomes severe and is the major factor for writability degradation.

Therefore, a new shield design is needed to minimize internal flux shunting in order to provide improved writability while enabling TPI capability to at least 400K/in for CMR and at least 500K/in for SMR.

SUMMARY

One objective of the present disclosure is to provide a shield structure for a PMR writer that minimizes internal flux shunting to enable better writability for both CMR and SMR.

Another objective of the present disclosure is to provide a method of making the shield structure of the first objective with conventional materials and processes.

According to one embodiment of the present disclosure, these objectives are achieved by configuring a shield structure for a PMR writer wherein a partial side shield on each side of a main pole is magnetically coupled to a trailing shield. A bottom portion of each side shield and a leading shield proximate to a leading side of the main pole at the ABS are omitted. Each partial side shield has a 19 to 24 kG hot seed layer with a first side adjoining a side gap and a second side opposite the first side. Each partial side shield also includes a 10-19 kG magnetic layer with a first side facing the main pole and adjoining the second side of the hot seed layer. The side shield hot seed layer extends to a first height from the ABS while the 10-19 kG magnetic layer extends from the ABS to a second height greater than the first height. Each side gap is non-conformal in that there is a smaller cross-track width in a first side gap section which separates the side shield hot seed layer and main pole than in a second side gap section that separates the 10-19 kG magnetic layer and main pole between the first height and second height. A bottom surface of each of the side shield hot seed layers and 10-19 kG magnetic layer is formed a down-track distance of 0 to 50 nm above a first plane that includes a bottom edge of the write pole at the ABS.

The trailing shield is a composite structure having a 19-24 kG hot seed layer formed on the write gap and is fully magnetically coupled to the side shield hot seed layers. In other words, the entire top surface of the side shield hot seed layers adjoins a first portion of the trailing shield hot seed layer on each side of the write gap along a second plane that includes a trailing edge of the write pole and top surfaces of the side gaps at the ABS. The write gap has a cross-track width equal to the cross-track width between outer sidewalls of the side gaps at the first plane. The trailing shield hot seed layer also has a second portion contacting a top (trailing) surface of the write gap. Each first portion of trailing shield hot seed layer has an outer sidewall that may be coplanar with the second side of a side shield hot seed layer along a third plane. In some embodiments, the third plane is orthogonal to the first and second planes. In other embodiments, the third plane may be formed at an angle that is 90±15 degrees with respect to the first and second planes. The composite trailing shield also comprises a 10-19 kG magnetic layer formed on a top surface and along the outer sidewalls of the trailing shield hot seed layer. The trailing shield 10-19 kG layer also contacts the top surfaces of the side shield 10-19 kG layers along the second plane.

In a second embodiment, the features of the first embodiment are retained except the composite side shield extends a distance of up to 100 nm below the first plane. In both embodiments, there is no leading shield so the shield structure is not an all wrap around design.

From a down-track cross-sectional view, leading and trailing sides of the main pole proximate to the ABS may be tapered with respect to a center plane that bisects the main pole and is formed orthogonal to the ABS. As a result, the write gap may be tapered with respect to the center plane and a back side thereof is a greater down-track distance from the center plane than the front side of the write gap at the ABS. Moreover, the trailing shield hot seed layer has a first side facing the main pole that may be aligned substantially parallel to the tapered main pole trailing side. In one embodiment, the first side has a first section that extends a third height from the ABS and is separated from the tapered main pole tapered side by the write gap thickness, and there is a second section of the first side that extends from the third height to a fourth height and is separated from the tapered man pole tapered side by a distance greater than the write gap thickness. The second section ends at a back side of the trailing shield hot seed layer. The second magnetic layer in the first trailing shield layer preferably has a back side formed at the same fourth height from the ABS as trailing shield hot seed layer.

A method for forming the shield structure of the present disclosure is provided. The main pole with surrounding gap layer is formed within an insulation layer. The gap layer preferably comprises a Ru layer adjacent to the main pole sides and bottom surface. The insulation layer is selectively etched to remove a top portion thereof and thereby expose an upper portion of side gap layers and main pole trailing side. A dielectric layer is conformally deposited to form a write gap and an outer gap layer on the exposed inner Ru gap layer. Then, a 19-24 kG hot seed layer may be conformally deposited on the dielectric layer to form the side shield and trailing shield hot seed layers that are fully coupled. The side shield hot seed layer is trimmed in the cross-track direction by a photoresist patterning step followed by an etch process. Finally, a 10-19 kG magnetic layer is deposited on the hot seed layer to form the remainder of the side shield and trailing shield structure.

BRIEF DESCRIPTION OF THE DRAWINGS

FIGS. 9-17 depict a sequence of steps employed to fabricate a shield design with a partial side shield structure according to an embodiment of the present disclosure wherein FIGS. 9 and 12-17 are ABS views and FIGS. 10-11 are down-track cross-sectional views.

DETAILED DESCRIPTION

Figure 1:
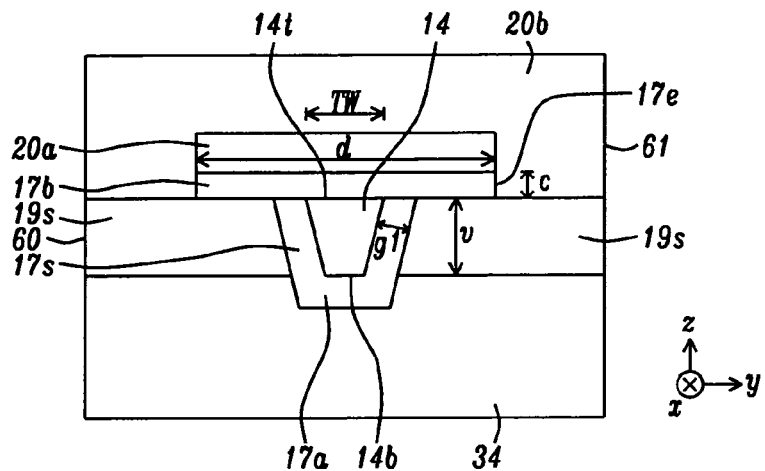
FIG. 1 is an ABS view of a prior art shield design for a PMR writer wherein the shields form an all wrap around (AWA) shield structure around the main pole.

The present disclosure is a partially wrapped around shield structure that minimizes internal flux shunting from the main pole to surrounding shields in a PMR writer. Although the exemplary embodiments depict a main pole with a tapered leading side and tapered trailing side, the present disclosure also anticipates embodiments wherein one or both of the main pole leading side and trailing side are not tapered. Furthermore, the PMR writer may have a combined read head/write head structure. The shield structure of the present disclosure is not limited to a particular read head or write head design. In the drawings, the y-axis is a cross-track direction, the z-axis is a down-track direction, and the x-axis is in a direction orthogonal to the ABS and towards a back end of the device.

Referring to FIG. 1, an ABS view of a prior art shield design is shown wherein a main pole has a front portion referred to as a write pole 14 at the ABS with leading edge 14b, and a trailing edge 14t which defines a track width TW. The main pole extends to a back end of the PMR writer where a back portion (not shown) is magnetically connected to the trailing shield comprised of an upper 16-19 kG magnetic layer 20b and a 19-24 kG hot seed layer 20a where the hot seed layer has a cross-track width d preferably the same as that of the write gap 17b.

Side shields 19s have a down-track thickness v and are separated from the write pole by a side gap 17s having a cross-track width g1. Each side shield has a top surface that adjoins trailing shield layer 20b between a side 17e of the write gap and a side 60 (or 61) of the side shield. There is also a leading shield 34 which is separated from leading edge 14b by a lead gap 17a. The leading shield adjoins the side shields and the shield structure around the main pole thereby forms an all wrap around (AWA) design to improve field gradients in the down-track and cross-track directions as well as adjacent track erasure (ATE) performance. Center plane 44-44 bisects the main pole 18 and is aligned orthogonal to the ABS 30-30.

Figure 2A:
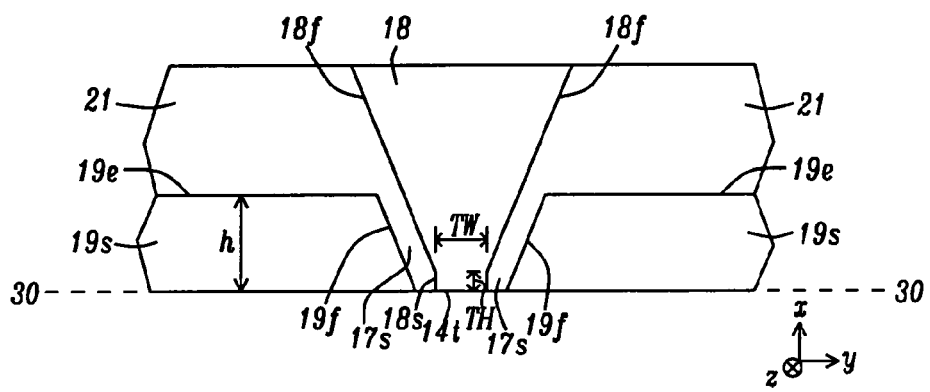
FIG. 2a is a top-down view of the AWA shield structure in FIG. 1 where the trailing shield is removed to show the layout of the main pole and side shields.

FIG. 2a shows a top-down view of the side shield structure in FIG. 1 with the trailing shield and write gap removed. The write pole trailing edge 14t is at the ABS 30-30 and a write pole side 18s extends orthogonal to the ABS to a throat height (TH). Side shields 19s may have a sidewall 19f facing the main pole and formed substantially parallel to flared main pole sides 18f. Side shield back sides 19e are typically parallel to the ABS and adjoin a dielectric layer 21.

Figure 2B:
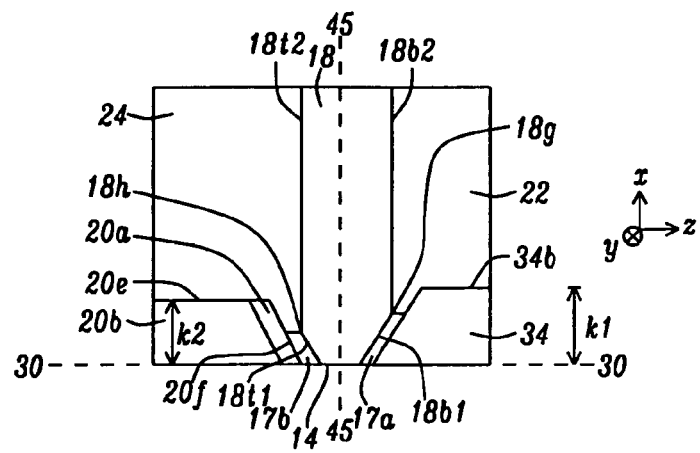
FIG. 2b is a down-track cross-sectional view of the AWA shield structure in FIG. 1 where a leading shield, trailing shield, and main pole with tapered leading and trailing sides is illustrated.

FIG. 2b depicts a down-track cross-sectional view of the shield structure along center plane 44-44 in FIG. 2a. Main pole 18 has a tapered leading side 18b1 with a first end at the ABS 30-30 and a back end at corner 18g. A second leading side 18b2 adjoins a dielectric layer 22, extends from corner 18g toward a back end of the PMR writer, and parallel to plane 45-45 formed orthogonal to the ABS. The main pole also has a tapered trailing side 18t1 between the ABS and corner 18h. A second trailing side 18t2 adjoins a dielectric layer 24, has a front end at corner 18h and extends toward a back end of the PMR writer, and parallel to plane 45-45. The leading shield 34 has a front side at the ABS, and a backside 34b at a height k1 from the ABS where the backside contacts dielectric layer 22. The trailing shield hot seed layer 20a has a side 20f facing the tapered main pole trailing side and formed substantially parallel thereto, and a back side that is a height k2 from the ABS. Trailing shield layer 20b has a front side at the ABS and a back side at height k2. Leading gap 17a and write gap 17b contact main pole sides 18b1, 18t1, respectively.

The PMR writer in FIGS. 1 and 2a-2b requires optimization to be acceptable for advanced technologies that will be used in commercial products. In particular, a thinner write gap thickness c, and narrower side gap dimension g1 are the preferred directions for better on track field gradient (BPI) and cross-track field gradient (TPI), respectively. Furthermore, to enhance writability, side shield height reduction is important not only to reduce main pole flux shunting to side shields, but also to allow more main pole volume closer to the ABS. Note that height reduction refers to the distance h the side shields 19s extend from the ABS in an x-axis direction. In the POR design in FIG. 2a, side shield height reduction below 0.15 micron is likely to cause side shield saturation and degradation in cross-track gradient. For advanced PMR writer designs, it is desirable to have writability from side shield height reduction and more main pole volume closer to the ABS while maintaining a good cross-track field gradient (TPI capability).

We disclosed in related patent application Ser. No. 14/690,693 and illustrated in FIGS. 3a-3b therein a PMR writer with an all wrap around (AWA) shield structure that enables the aforementioned objectives to be largely achieved. In the AWA shield structure, each side shields has a high saturation magnetization (hot seed) layer made of 19-24 kG material formed at an interface with the side gap, and a second magnetic (10-16 kG) layer adjoining a side of the hot seed layer that is opposite the side gap. Furthermore, the leading shield preferably has an uppermost hot seed layer that interfaces with the lead gap and connects with the side shield hot seed layers, and a lower magnetic layer made of 10-16 kG material that adjoins the second magnetic layers in the side shields. As a result, when side gap g1 is reduced to a 20-60 nm range, and side shield height is decreased to 0.15 micron or less, side shield saturation may be prevented while writability is maintained or enhanced.

Figure 3A:
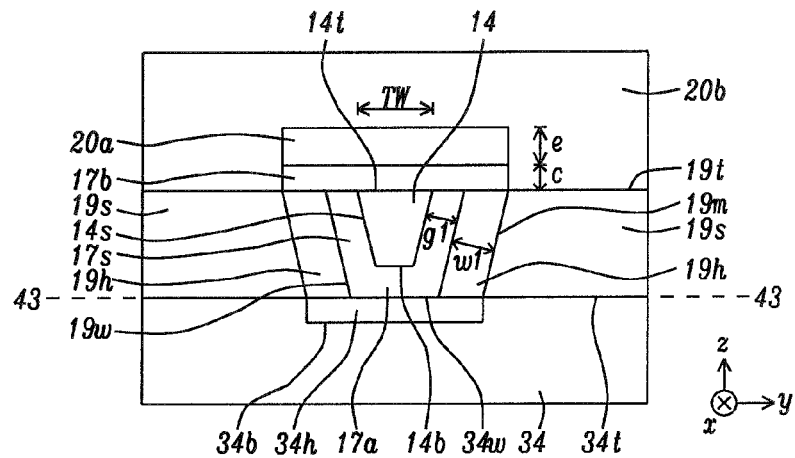
FIG. 3a is an ABS view of an AWA shield design fabricated by the inventors where a hot seed layer is formed between a gap layer and a second magnetic layer in each of the leading shield, trailing shield, and side shields.

Referring to FIG. 3a in the present disclosure, an ABS view of the AWA shield structure according to a process of record (POR) practiced by the inventors is shown. The trailing shield design from FIG. 1 is retained. However, the side shields and leading shield are configured to include a hot seed layer that interfaces with side gaps 17s and leading gap 17a, respectively. There is a leading shield hot seed layer 34h formed with a top surface 34w along a plane 43-43 that includes a bottom surface of the leading gap 17a and a top surface 34t of side portions of the leading shield layer 34. Hot seed layer 34h is aligned below the write pole leading edge 14b and has bottom surface 34b. Thus, the leading shield is considered to be a composite with a lower magnetic layer 34 made of a 10-16 kG material, and an upper hot seed layer 34h made of a 19-24 kG material wherein the latter has a substantially smaller cross-track width than the former. All shield layers and the main pole may be selected from one of CoFeN, CoFeNi, NiFe, or CoFe.

Adjoining both ends of the hot seed layer 34h at a top surface that is along plane 43-43 is a side shield hot seed layer 19h that is preferably comprised of the same material and with a cross-track width w1 that is equal to the down-track thickness of the leading shield hot seed layer. Hot seed layer 19h has a bottom surface contacting plane 43-43 and a top surface at plane 42-42 which includes the write pole trailing edge 14t at the ABS. Hot seed layer 19h has an inner side 19w facing the write pole tip 14 that adjoins a side gap 17s, and has an outer side 19m facing away from the write pole tip that adjoins a side shield layer 19s. Preferably, both sides 19w, 19m are aligned substantially parallel to a nearest write pole side edge 14s. Therefore, each side shield is considered to be a composite with an "inner" hot seed layer 19h, and an "outer" shield layer 19s made of a 10-16 kG material. Preferably, thickness w1 is from 10 to 100 nm, and more preferably, is from 20 to 60 nm. Note that the side shield hot seed layers 19h are not magnetically coupled to the trailing shield hot seed layer 20a.

The first trailing shield structure comprised of hot seed layer 20a and a second magnetic layer 20b is retained from FIG. 1. A top surface of layer 20b contacts a second (PP3) trailing shield (not shown), and forms a magnetic connection (trailing loop) to a back portion of the main pole thereby allowing magnetic flux to return from a magnetic medium to the main pole. As in FIG. 1, hot seed layer 20a and write gap 17b have a cross-track width greater than track width TW of the write pole trailing edge 14t. Trailing shield layer 20b, side shield layers 19s, and leading shield layer 34 form an AWA configuration around the main pole at the ABS.

Figure 3B:
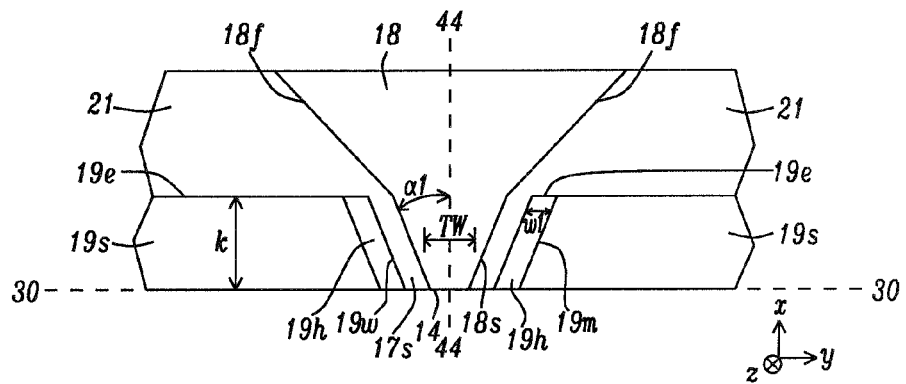
FIG. 3b is a top-down view of the AWA shield structure in FIG. 3a where the trailing shield is removed to show the main pole and composite side shields.

Referring to FIG. 3b, a top-down view of the side shield structure from FIG. 3a is shown with the write gap and trailing shields removed. Write pole sides 18s extend from the ABS and connect with flared sides 18f of the main pole. Sides 18s have a so-called attack angle α of 0 to 30 degrees with respect to the center plane 44-44 formed orthogonal to the ABS 30-30 and that bisects the main pole 18. Hot seed layer 19h has sides 19w, 19m which are formed substantially parallel to write pole sides 18s, and has a back side 19e at height k. The composite side shield adjoins dielectric layer 21 at back side 19e.

Figure 3C:
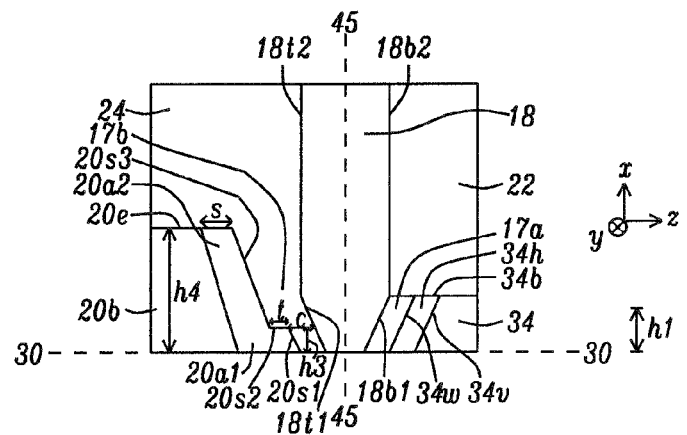
FIG. 3c is a down-track cross-sectional view of the AWA shield structure in FIG. 3a where a composite leading shield, composite trailing shield, and main pole with tapered leading and trailing sides are illustrated.

In FIG. 3c, a down-track cross-sectional view along plane 44-44 in FIG. 3b is shown and retains the features of FIG. 2b except leading shield hot seed layer 34h is inserted between leading gap 17a and leading shield 34 from the ABS to first height h1. Hot seed layer 34h has side 34w adjoining the leading gap and side 34b adjoining the leading shield. Preferably, sides 34w, 34b are substantially parallel to tapered main pole leading side 18b1. There is a second leading side 18b2 of the main pole that is aligned parallel to a second plane 45-45 which is orthogonal to the ABS and to plane 44-44.

The trailing shield hot seed layer may comprise two sections where a first section 20a1 has a front side at the ABS 30-30, a side 20s1 facing tapered main pole trailing side 18t1 and separated therefrom by a write gap thickness, and a back side 20s2 connected to side 20s1 at a third height h3 of 30 to 100 nm and formed parallel to the ABS. There is a second section 20a2 of trailing shield hot seed layer that adjoins a portion of back side 20s2 and extends to a fourth height h4 substantially greater than h3. Second section 20a2 has a side 20s3 facing tapered main pole trailing side 18t1 and separated therefrom by greater than a write gap thickness c. The offset t between sides 20s1 and 20s3 may be from 0 to 60 nm. As the magnitude of t increases, flux shunting from the main pole to the trailing shield should be minimized, especially as write gap thickness decreases. The down-track thickness s of the second section may be from 20 to 150 nm.

We have discovered new improvements in the hot seed layer structure adjacent to the main pole that further enables the objective of less internal flux shunting and overwrite gain while maintaining writability. Furthermore, we have observed better magnetic field gradient in both the down-track and cross-track directions. In particular, the leading shield is entirely removed, and the side shield hot seed layer is fully magnetically coupled to the trailing shield hot seed layer.

Figure 4A:
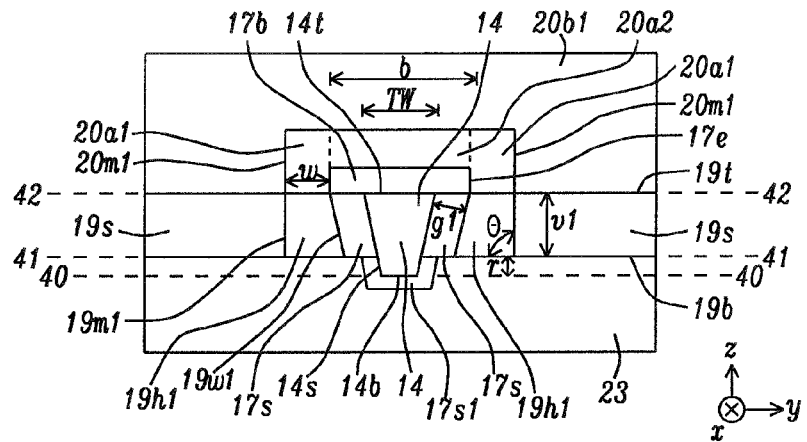
FIG. 4a is an ABS view of a shield design having a trailing shield and partial side shield structure according to a first embodiment of the present disclosure.

Referring to FIG. 4a, a first embodiment of the present disclosure is depicted wherein the composite trailing shield structure of FIG. 3a is largely retained except the write gap has a shorter cross-track width that does not extend beyond the side gaps. There is a write pole 14 with leading edge 14b, trailing edge 14t, and side edges 14s as described previously. Write gap 17b has sides 17e and a cross-track width b of 50 to 150 nm that is preferably equal to the cross-track distance between inner sidewalls 19w1 of side shield hot seed layers 19h1 along plane 42-42. Plane 42-42 includes trailing edge 14t, top surfaces of side gaps 17s, top surfaces of side shield hot seed layers 19h1, and top surfaces of side shield layers 19s. Side gaps 17s adjoin write pole side edges 14s at the ABS, inner sidewall 19w1 contacts a side gap layer, and an outer sidewall 19m1 of each hot seed layer 19h1 adjoins a side shield layer 19s. The composite side shield including layers 19s, 19h1 may be a partial side shield in that a bottom surface 19b formed along plane 41-41 may be formed a down-track distance r of 0 to 50 nm above plane 40-40 that includes write pole leading edge 14b. Inner sidewall 19w1 is preferably parallel to the nearest write pole edge 14s. However, outer sidewall 19m1 may be formed at angle θ which is 90±15 degrees with respect to plane 41-41. Each composite side shield has a down-track thickness v1 between plane 41-41 and plane 42-42. Note the side gaps 17s1 below plane 41-41 may have a smaller cross-track thickness than g1 for gaps 17s. This embodiment is preferred for shingled magnetic recording.

The trailing shield hot seed layer has a first portion 20a1 with sidewall 20m1 on each side of the write gap, and a cross-track width w of 10 to 150 nm between write gap side 17e and sidewall 20m1 at plane 42-42. Moreover, sidewall 20m1 is preferably coplanar with outer sidewall 19m1 of hot seed layer 19h1. Thus, each side shield hot seed layer is fully coupled to the trailing shield hot seed layer since a top surface of each layer 19h1 is fully contacted by the first portion 20a1. There is a second portion 20a2 of trailing shield hot seed layer adjoining a write gap trailing surface and with cross-track width b. As a result, the trailing shield hot seed layer consisting of portions 20a1, 20a2 completely surrounds the write gap above plane 42-42. In the exemplary embodiment, there is no leading shield. Instead, dielectric layer 23 contacts gap layer 17s1 below plane 41-41, and adjoins bottom surface 19b of each side shield 19s along plane 41-41.

The composite trailing shield also includes a 10-19 kG magnetic layer 20b1 and adjoins a top surface of hot seed layer 20a2 and top and side surfaces of hot seed layer 20a1. Side shield layers 19s are made of the same 10-19 kG material as in magnetic layer 20b1 and are fully coupled to the trailing shield layer 20b1 through contact at top surfaces 19t along plane 42-42.

Because of the absence of a leading shield, and a partial side shield structure, internal flux shunting to the leading shield and side shields found in all wrap around (AWA) designs such as depicted in FIG. 1 and FIG. 3a is greatly reduced. As a result, writability is enhanced. To compensate for the writer bubble being less defined at the write pole leading edge, the side shield hot seed layer 19h1 in FIG. 4a is fully coupled to the trailing shield hot seed layer 20a1 and thereby enables TPI to be recovered compared with the conventional shield design in FIG. 1. Secondly, with improved overwrite, reducing the side gap width g1 from a normal range of 20 to 60 nm to 10 to 30 nm, and lowering the write gap thickness from 25-35 nm in the prior art to 10-20 nm in the present disclosure further enables TPI recovery to an acceptable level.

Figure 4B:
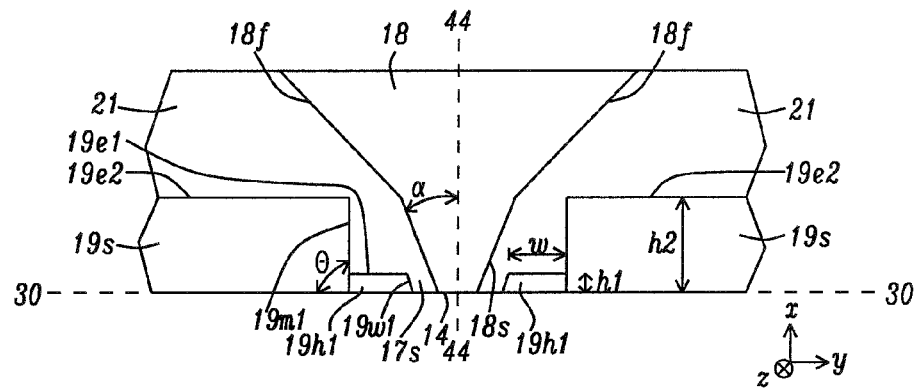
FIG. 4b is a top-down view of the shield structure in FIG. 4a where the trailing shield is removed to show the main pole and composite side shields.

FIG. 4b illustrates a top-down view of the side shield structure along plane 42-42 in FIG. 4a after the composite trailing shield and write gap have been removed. Note that plane 42-42 (and plane 40-40) shown in FIG. 4a are orthogonal to the ABS and to center plane 44-44. Hot seed layers 19h1 have a cross-track width w of 10 to 150 nm at the ABS 30-30 and a back side 19e1 formed substantially parallel to the ABS at a height h1 of 10 to 150 nm therefrom. Inner sidewall 19w1 is preferably parallel to side 18s of the write pole. Side 18s may be formed with a so-called attack angle α of 0 to 30 degrees with respect to center plane 44-44 and connects with main pole flared side 18f. Side shield layers 19s have a back side 19e2 that is height h2 from the ABS where h2>h1. Side 19m1 between hot seed layer 19h1 and side shield layer 19s has an angle θ of 90±15 degrees with respect to plane 41-41 as explained earlier which means side 19m1 may be parallel to the center plane when θ=90 degrees as depicted in the exemplary embodiment illustrated in FIG. 4a and FIG. 4b. Gap layer 17s is said to be non-conformal in that there is a greater cross-track distance between side 19m1 and write pole side 18s than between side 19w1 and side 18s.

Figure 4C:
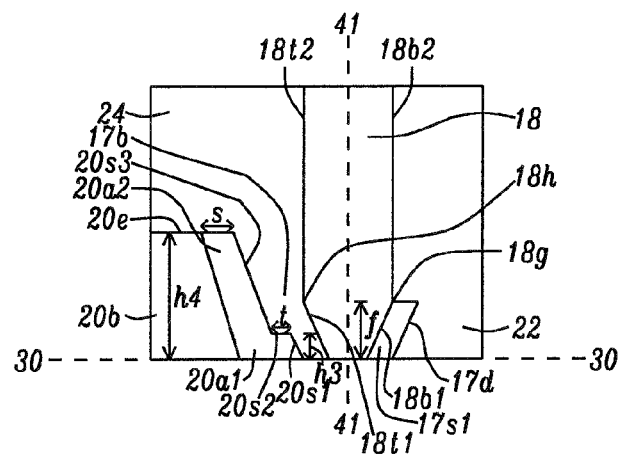
FIG. 4c is a down-track cross-sectional view of the shield structure in FIG. 4a where a composite trailing shield, and a main pole with tapered leading and trailing sides are illustrated.

In FIG. 4c, a down-track cross-sectional view of the shield structure in FIG. 4a is depicted along center plane 44-44 in FIG. 4b. The trailing shield structure from FIG. 3a is retained but the leading shield is completely removed such that dielectric layer 22 adjoins the ABS 30-30 and an outer side 17d of the first gap layer portion 17s1. Plane 41-41 is shown between and parallel to main pole sides 18b2, 18t2.

According to a second embodiment depicted in the ABS view in FIG. 5 that may be employed for either CMR or SMR, the shield structure features in FIG. 4a are retained except the composite side shield including layers 19h1 and 19s now has a bottom surface 19b formed along plane 43-43 below plane 40-40. In particular, bottom surface 19b is a down-track distance n of greater than 0 nm and up to 100 nm from plane 40-40. In some embodiments, side gap layer 17s has a uniform thickness g1 that corresponds to the down-track distance n between plane 40-40 and plane 43-43. In other embodiments, n may be less than the side gap thickness below plane 40-40. The second embodiment has the same top-down view (FIG. 4b) and down-track cross-sectional (FIG. 4c) view as the first embodiment. In comparison with the first embodiment, the writer bubble proximate to the write pole leading edge is somewhat better defined which means a slightly lesser loss in TPI. However, the side shield structure in the second embodiment is likely to have greater internal flux shunting and lower writability than in the first embodiment, especially as the value for n approaches 100 nm. For both the first and second embodiments, improved overwrite and bit error rate (BER) gain were realized compared with PMR writer structures in FIG. 1 and FIGS. 3a-3c according to spinstand measurements.

To further demonstrate the advantages of the present disclosure, a modeling study was performed where a conventional writer as shown in FIG. 1 with g1=45 nm, c=22 nm, TW=50 nm, v=70 nm, and d=0.4 micron was compared with a PMR writer having a shield design shown in FIG. 4a where w=70 nm, b=110 nm or 2g1+TW, θ=90 degrees, r=20 nm, v1=50 nm, and c=18 nm. The trailing shield (20a in FIG. 1, 20a1+20a2 in FIG. 4a) and side shield hot seed layers 19h1 (FIG. 4a) involved in the study are made of a 24 kG material.

Figure 6:
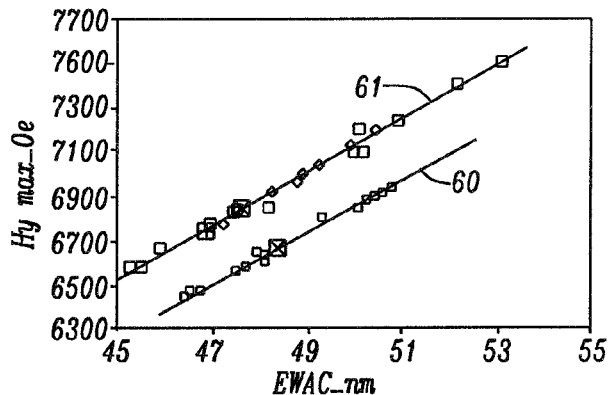
FIG. 6 is a plot comparing Hy vs. EWAC for a PMR writer with an AWA structure, and a PMR writer having a partial side shield design according to an embodiment of the present disclosure.

In FIG. 6, improved writability is illustrated on a graph of Hy_max Oe vs. erase width during AC mode (EWAC) where results from the FIG. 4a embodiment of the present disclosure are plotted on line 61 that has higher values for Hy_max at each EWAC value in nm than the reference (FIG. 1 structure) with points along line 60.

Figure 7:
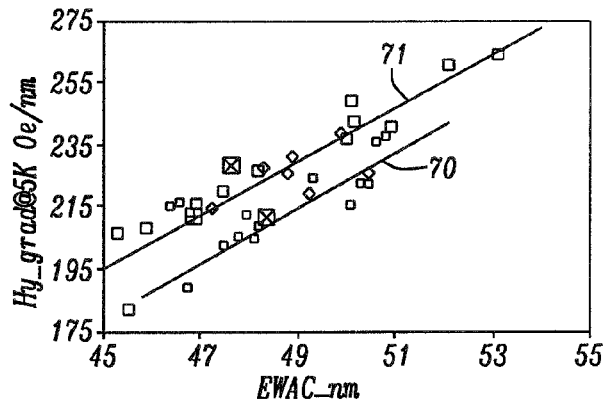
FIG. 7 is a plot comparing Hy grad @ 5K Oe/nm vs. EWAC for a PMR writer with an AWA structure, and a PMR writer having a partial side shield design according to an embodiment of the present disclosure.

In FIG. 7, a better down-track field gradient is observed for line 71 (first embodiment in FIG. 4a) compared with line 70 representing the FIG. 1 reference structure for results of Hy_grad@5K Oe/nm vs EWAC (nm).

Figure 8:
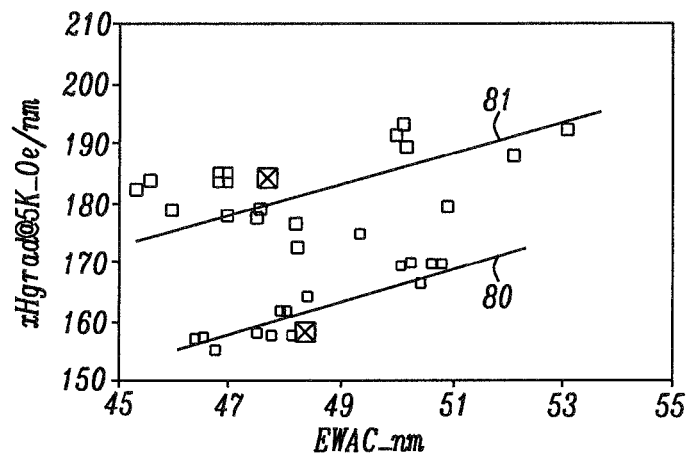
FIG. 8 is a plot comparing Hy grad x @ 5K Oe/nm vs. EWAC for a PMR writer with an AWA structure, and a PMR writer having a partial side shield design according to an embodiment of the present disclosure.

FIG. 8 shows an improved cross-track field gradient for line 81 (first embodiment structure) compared with line 80 (FIG. 1 reference). Hy_grad_x results are plotted vs. EWAC (nm).

The present disclosure also encompasses a method of forming a PMR writer having a main pole that is partially wrapped around by a 19-24 kG (hot seed) magnetic layer in the side shields and trailing shield at the ABS, and where the side shield hot seed layer is fully coupled to the trailing shield hot seed layer. FIGS. 9-15 depict a sequence of steps whereby the shield structure of the first embodiment is fabricated.

Figure 9:
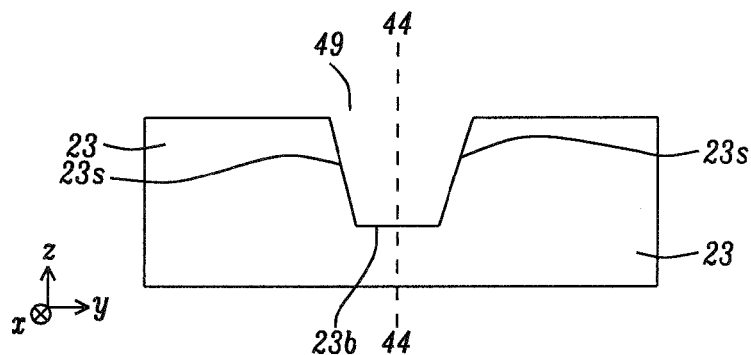

Referring to FIG. 9, an opening 49 corresponding to the desired shape and size of the main pole is formed in dielectric layer 23. The opening has sides 23s, and a bottom surface 23b, and is bisected by center plane 44-44. The dielectric layer may be comprised of alumina or the like. In embodiments wherein the main pole 18 has a tapered leading side as in FIG. 4c, a taper is formed on bottom surface 23b at this point by a well known ion beam etching (IBE) process before the main pole is deposited in a later step. FIG. 9 is a view from the eventual ABS 30-30 shown in FIG. 10.

Figure 10:
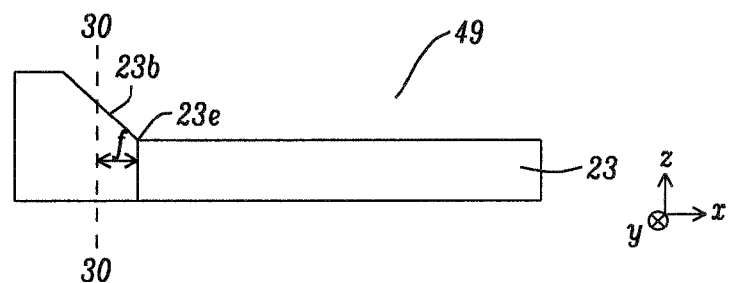

In FIG. 10, a down-track cross-sectional view is shown along plane 44-44 in FIG. 9. Bottom surface 23b is tapered and has an end 23e that is the same distance (height f) from plane 30-30 as corner 18g in FIG. 4c.

Figure 11:
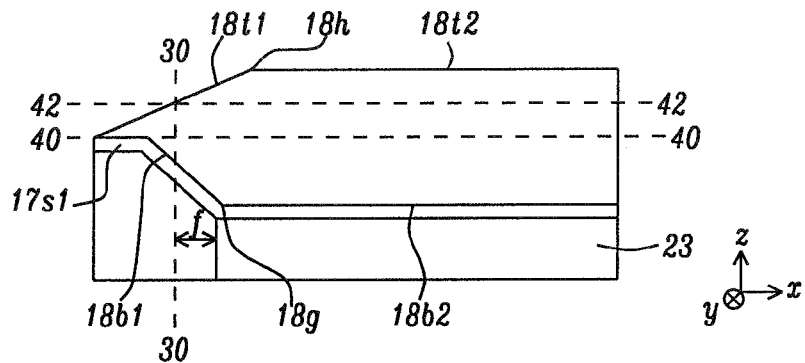

FIG. 11 is a view of the partially formed PMR writer in FIG. 10 after the gap layer 17s1, and main pole 18 are sequentially deposited to fill opening 49. Because of tapered side 23b (corresponding to side 17d of gap layer 17s1), and a conformal gap layer 17s1, the main pole has a tapered leading side 18b1 that is substantially parallel to tapered side 23b. Thereafter, a chemical mechanical polish (CMP) process may be performed to form a planar main pole trailing surface 18t2. The trailing side of the main pole is then ion beam etched by a conventional process to form tapered side 18t1 that extends from plane 30-30 to corner 18h. Plane 42-42 intersects plane 30-30 at tapered side 18t1, and plane 40-40 intersects plane 30-30 at tapered side 18b1. All layers to the left side of plane 30-30 will be eventually removed during a lapping process after all layers in the PMR writer are formed.

Figure 12:
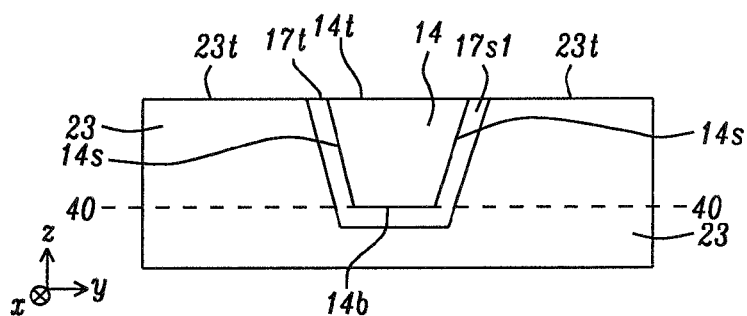

Referring to FIG. 12, a view from plane 30-30 in FIG. 11 is depicted and shows write pole 14 surrounded on the sides 14s and along leading edge 14b by gap layer 17s1. Write pole trailing edge 14t is coplanar with top surface 17t of the gap layer and 23t of dielectric layer 23. The gap layer may be a composite and preferably has a lower (outer) layer made of Ru or the like that contacts dielectric layer 23 and with a greater etch resistance than the dielectric layer in a subsequent etch step which is employed to selectively remove a top portion of the dielectric layer 23.

Figure 13:
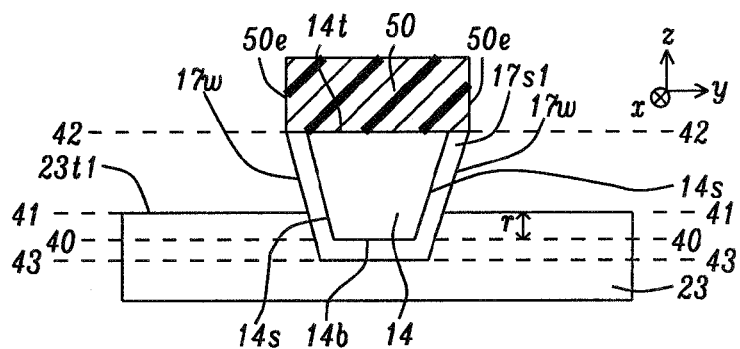

In FIG. 13, a photoresist layer 50 is coated on top surface 17t, top surface 23t, and on the main pole including write pole trailing edge 14t, and is then patterned to form sidewalls 50e that are aligned above gap layer sides 17w at plane 42-42, thereby exposing top surface 23t while protecting top surfaces 14t, 17t. Thereafter, a wet etch, or dry etch such as ion beam etching (IBE) is performed to remove a portion of dielectric layer and form a new top surface 23t1 along plane 41-41 that is a down-track distance r above plane 40-40. Gap layer 17s1 has an exposed surface 17w with a substantially greater resistance to the wet or dry etch conditions than the dielectric layer 23.

Figure 14:
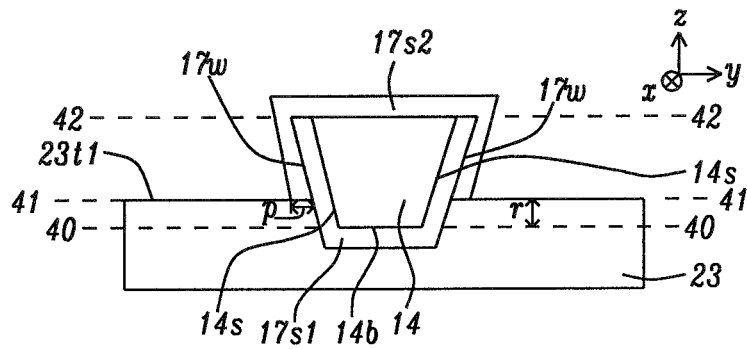

Referring to FIG. 14, the photoresist layer is removed by a well known stripping process. Then, gap layer 17s2 is conformally deposited on sides 17w, top surface 17t, and write pole trailing edge 14t. It should be understood that the gap layer 17s2 and gap layer 17s1 may extend to different heights behind the ABS. Gap layer 17s2 together with gap layer 17s1 above plane 41-41 forms side gap 17s in subsequent drawings and in FIG. 4a. Moreover, a top portion of gap layer 17s2 becomes write gap 17b in the final shield structure shown in FIG. 4a. A portion of gap layer 17s2 that is formed on top surface 23t1 and greater than a cross-track distance p from side 17w may be removed by a conventional photoresist patterning and etching sequence as appreciated by those skilled in the art.

Figure 15:
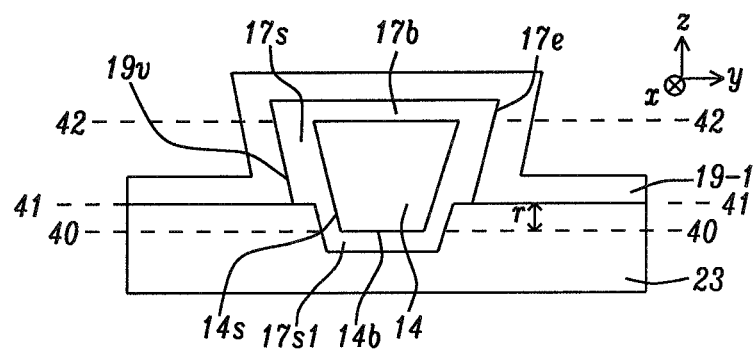

FIG. 15 shows the partially formed shield structure in FIG. 14 after a hot seed layer 19-1 is laid down on write gap 17b, side gaps 17s, and top surface 23t1. The hot seed layer may be deposited by plating and becomes the trailing shield and side shield hot seed layers in FIG. 4a. However, ion beam deposition is typically preferred when a substantially conformal hot seed layer is desired.

Figure 16:
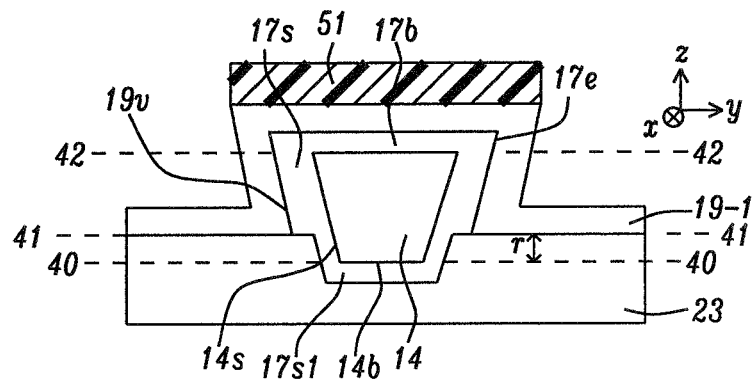

Referring to FIG. 16, a second photoresist layer is coated on hot seed layer 19-1 and is patterned to leave a protective mask 51 on a substantial portion of the hot seed layer above write gap 17b. The patterned second photoresist layer exposes portions of the hot seed layer on top surface 23t1 to be selectively removed by an etch process in a subsequent step.

Figure 17:
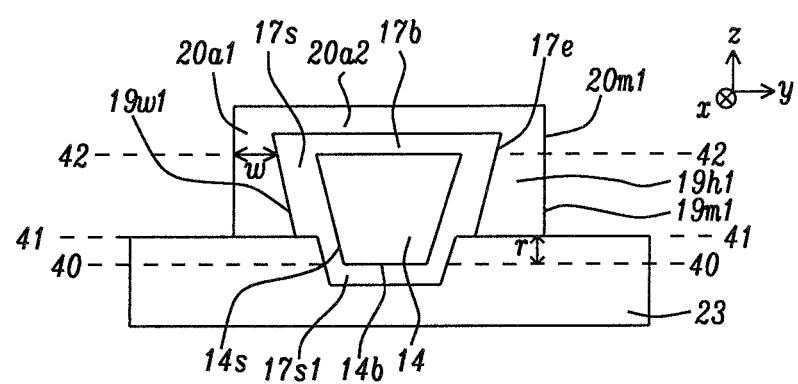

FIG. 17 shows the shield structure in FIG. 16 after an IBE etch, for example, is performed to remove unprotected portions of hot seed layer 19-1 thereby forming hot seed layer portions 20a1, 20a2 above plane 42-42, and side shield hot seed layer 19h1 below plane 42-42. Etch conditions may be adjusted to generate sidewalls 19m1, 20m1 that are either essentially vertical, have a positive slope (θ<90 degrees), or a negative (undercut) slope where θ>90 degrees.

Thereafter, a 10-19 kG magnetic layer is deposited on top surface 23t1, along sidewalls 19m1, 20m1, and on top surface 20t of the trailing shield hot seed layer to provide side shield layers 19s and trailing shield layer 20b1 in the shield structure shown in FIG. 4a.

Figure 5:
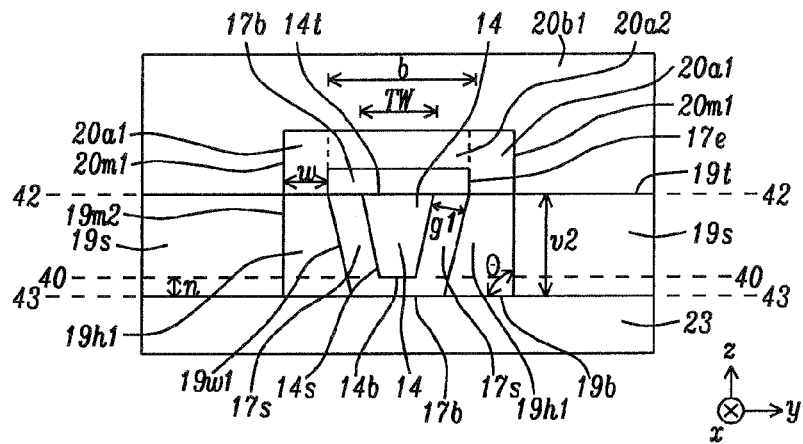
FIG. 5 is an ABS view of a shield design having a trailing shield and partial side shield structure according to a second embodiment of the present disclosure.

In order to fabricate the shield structure of the second embodiment shown in FIG. 5, the etch back process in FIG. 13 is extended to remove an additional section of dielectric layer between plane 41-41 and plane 43-43. Thereafter, the same sequence of processes represented by FIGS. 14-17 is followed to generate the shield structure in FIG. 5 where side shield hot seed layer 19h1 now has a sidewall 19m2 that is coplanar with sidewall 20m1 and is formed between plane 42-42 and plane 43-43.

The partially wrapped around shield structure described herein has flexibility in that the down-track thickness of the side shield hot seed layer, and cross-track width of the trailing shield and side shield hot seed layers may be easily modified to adjust the down-track and cross-track field gradients, respectively, and writability. Furthermore, conventional materials and processes are employed in the fabrication without a significant cost increase.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading edge at an air bearing surface (ABS) and formed at a first plane, and a trailing edge at the ABS and formed at a second plane where the first and second planes are parallel to each other and are orthogonal to the ABS and to a center plane formed equidistant between two main pole sides that connect the leading edge and trailing edge;
   (b) a gap layer surrounding the main pole at the ABS and comprising a write gap that contacts the trailing edge and has a first cross-track width, and a side gap layer adjoining the main pole sides and leading edge;
   (c) a composite side shield, comprising;
      (1) a 19-24 kG magnetic (first hot seed) layer on each side of the center plane with an inner sidewall adjoining a portion of the side gap layer above a third plane that is formed between and parallel to the first and second planes, the third plane is a first down-track distance from the first plane, and the first hot seed layer has outer sidewall adjoining a first 10-19 kG magnetic layer; and
      (2) the first 10-19 kG magnetic layer wherein each of the first 10-19 kG magnetic layer and first hot seed layer have a top surface at the second plane and a bottom surface at the third plane; and
   (d) a composite trailing shield, comprising:
      (1) a second 19-24 kG hot seed layer adjoining a top surface and sides of the write gap, the second hot seed layer has an outer sidewall formed coplanar with an outer sidewall of the first hot seed layer on each side of the center plane and a bottom surface that contacts and essentially covers the top surface of the first hot seed layer at the second plane; and
      (2) a second 10-19 kG magnetic layer that adjoins a top surface and outer sidewalls of the second hot seed layer, and contacts the first 10-19 kG magnetic layer at the second plane.

2. The PMR writer of claim 1 wherein each of the first and second hot seed layers has a cross-track width of about 10 to 150 nm at the second plane.

3. The PMR writer of claim 1 wherein the outer sidewalls of the first and second hot seed layers form an angle of 90±15 degrees with respect to the third plane.

4. The PMR writer of claim 1 wherein the first down-track distance is from 0 to about 50 nm.

5. The PMR writer of claim 1 wherein the first hot seed layer has a front side at the ABS and a back side that is a first height (h1) from the ABS in a direction parallel to the center plane, and the first 10-19 kG magnetic layer has a front side at the ABS and a back side at a second height (h2) from the ABS where h2>h1.

6. The PMR writer of claim 5 wherein h1 is from 10 to 150 nm.

7. The PMR writer of claim 5 wherein the inner sidewall of the first hot seed layer is a second cross-track width from a nearest main pole side and is formed substantially parallel thereto, and the outer sidewall of the first hot seed layer is greater than the second cross-track width from the nearest main pole side.

8. The PMR writer of claim 1 wherein the main pole has a tapered trailing side including the trailing edge at the ABS and the second hot seed layer has a first portion at the ABS and with a side facing the main pole tapered trailing side and separated therefrom by a second down-track thickness, and the second hot seed layer has a second portion adjoining a back side of the first portion at a third height from the ABS wherein the second portion has a side facing the main pole tapered trailing side that is greater than the second down-track thickness from the main pole tapered trailing side.

9. The PMR writer of claim 1 wherein the inner sidewall of each first hot seed layer is formed at an angle of 0 to 30 degrees with respect to the center plane.

10. The PMR writer of claim 1 wherein the write gap has a first cross-track width of 50 to 150 nm, and a thickness from 10 to 20 nm at the ABS.

11. A perpendicular magnetic recording (PMR) writer, comprising:
   (a) a main pole with a leading edge at an air bearing surface (ABS) and formed at a first plane, and a trailing edge at the ABS and formed along a second plane where the first and second planes are parallel to each other and are orthogonal to the ABS and a center plane formed equidistant between two main pole sides;
   (b) a gap layer surrounding the main pole at the ABS and comprising a write gap that contacts the trailing edge and has a first cross-track width greater than a track width of the trailing edge, and a side gap layer adjoining the main pole sides and leading edge, the side gap layer has a first down-track thickness below the leading edge;
   (c) a composite side shield at the ABS and comprising;
      (1) a 19-24 kG magnetic (first hot seed) layer on each side of the center plane with an inner sidewall adjoining the side gap layer above a third plane that is formed parallel to the first plane, and less than or equal to the first down-track distance below the first plane, and the first hot seed layer has an outer sidewall adjoining a first 10-19 kG magnetic layer; and (2) the first 10-19 kG magnetic layer wherein each of the first 10-19 kG magnetic layer and first hot seed layer have a top surface at the second plane and a bottom surface at the third plane; and (d) a composite trailing shield at the ABS and comprising:
(1) a second hot seed layer made of a 19-24 kG material formed on a top surface and sides of the write gap, the second hot seed layer has an outer sidewall formed coplanar with an outer sidewall of the first hot seed layer on each side of the center plane, and a bottom surface that contacts and essentially covers the top surface of the first hot seed layer at the second plane; and
(2) a second magnetic layer made of a 10-19 kG material that adjoins a top surface and outer sidewalls of the second hot seed layer, and contacts the first 10-19 kG magnetic layer at the second plane.

12. The PMR writer of claim 11 wherein each of the first and second hot seed layers have a cross-track width of about 10 to 150 nm at the second plane.

13. The PMR writer of claim 11 wherein the outer sidewalls of the first and second hot seed layers form an angle of 90±15 degrees with respect to the third plane.

14. The PMR writer of claim 11 wherein the first down-track distance is greater than 0 nm, and is less than or equal to 100 nm.

15. The PMR writer of claim 11 wherein the first hot seed layer has a front side at the ABS and a back side at a first height (h1) from the ABS in a direction parallel to the center plane, and the first 10-19 kG magnetic layer has a front side at the ABS and a back side at a second height (h2) from the ABS where h2>h1.

16. The PMR writer of claim 15 wherein h1 is from 10 to 150 nm.

17. The PMR writer of claim 15 wherein the inner sidewall of the first hot seed layer is a second cross-track width from a nearest main pole side and is formed substantially parallel thereto, and the outer sidewall of the first hot seed layer is greater than the second cross-track width from the nearest main pole side.

18. The PMR writer of claim 11 wherein the main pole has a tapered trailing side including the trailing edge at the ABS, and the second hot seed layer has a first portion at the ABS and with a side facing the main pole tapered trailing side and separated therefrom by a second down-track thickness, and the second hot seed layer has a second portion adjoining a back side of the first portion at a third height from the ABS wherein the second portion has a side facing the main pole tapered trailing side that is greater than the second down-track thickness from the main pole tapered trailing side.

19. The PMR writer of claim 11 wherein the inner sidewall of each first hot seed layer is formed at an angle of 0 to 30 degrees with respect to the center plane.

20. The PMR writer of claim 11 wherein the write gap has a first cross-track width of 50 to 150 nm, and a thickness from 10 to 20 nm at the ABS.

21. A method of forming a perpendicular magnetic recording (PMR) writer with a partially wrapped around shield structure, comprising:

(a) forming a main pole with sides and a bottom (leading) side within a dielectric layer and with a top (trailing) side that is formed at a first plane which includes a top surface of the dielectric layer, a first side gap layer adjoins the main pole sides and leading side;

(b) removing a portion of the dielectric layer that is above a second plane thereby exposing a sidewall on the first side gap layer, the second plane is a first down-track thickness from a third plane which includes the leading side wherein the first, second, and third planes are parallel to each other, and are orthogonal to a center plane formed equidistant between the main pole sides;

(c) depositing a second side gap layer on the main pole trailing side and on the exposed sidewall of the first side gap layer, the second side gap layer on the main pole trailing side becomes the write gap in the PMR writer;

(d) depositing a 19-24 kG (hot seed) layer on the second side gap layer, the hot seed layer has an inner sidewall adjoining the second side gap layer, and a top surface above the write gap;

(e) etching the hot seed layer to form an outer sidewall on each side of the center plane, the outer sidewall has a top section above the first plane wherein the top section and hot seed layer top surface are exposed surfaces of a trailing shield hot seed layer, and a bottom section of the outer sidewall is an exposed surface of a side shield hot seed layer; and (f) depositing a 10-19 kG magnetic layer on exposed surfaces of the trailing shield hot seed layer and on the outer sidewall of the side shield hot seed layer to form a composite side shield comprising the side shield hot seed layer and a portion of the 10-19 kG magnetic layer below the first plane, and to form a composite trailing shield including the trailing shield hot seed layer and a portion of the 10-19 kG magnetic layer above the first plane.

22. The method of claim 21 further comprised of lapping the main pole, first and second side gap layers, composite trailing shield, and composite side shields to form an air bearing surface (ABS) and a shield structure wherein the side shield hot seed layer has a back side at a first height (h1) from the ABS, and the portion of the 10-19 kg magnetic layer formed below the first plane has a back side at a second height (h2) from the ABS where h2>h1.

23. The method of claim 21 wherein the second plane is between the first and third planes and the first down-track distance is from 0 to 50 nm.

24. The method of claim 21 wherein the second plane is a greater distance than the third plane from the first plane, and the first down-track distance is greater than 0 nm and less than or equal to 100 nm.

25. The method of claim 21 further comprised of forming a taper on the main pole trailing side before removing a portion of the dielectric layer and exposing the sidewall of the first side gap layer.

26. The method of claim 21 wherein outer sidewall forms an angle of 90±15 degrees with respect to the second plane.

27. The method of claim 21 wherein the side shield hot seed layer has a cross-track width from 10 to 150 nm at a top surface at the first plane.

28. The method of claim 22 wherein h1 is from 10 to 150 nm.

29. The method of claim 21 wherein the inner sidewall and main pole sides are formed at an angle of 0 to 30 degrees with respect to the center plane.

30. The method of claim 21 wherein the write gap has a down-track thickness from 10 to 20 nm, and a cross-track width of 50 to 150 nm.

31. The method of claim 21 wherein the inner sidewall of the side shield hot seed layer is a cross-track distance of 10 to 30 nm from a nearest main pole side.

* * * * *